April 26, 1932.  M. P. BROWN ET AL  1,855,904

SCREEN ORGANIZATION FOR FILTER OUTLETS

Filed Sept. 16, 1931

INVENTORS
MILES P. BROWN &
JAMES W. BROWN
BY Edward R. Inman
ATTORNEY

Patented Apr. 26, 1932

1,855,904

UNITED STATES PATENT OFFICE

MILES P. BROWN AND JAMES W. BROWN, OF FRANKLIN, PENNSYLVANIA

SCREEN ORGANIZATION FOR FILTER OUTLETS

Application filed September 16, 1931. Serial No. 563,126.

This invention relates to a screen organization for the outlet of oil filters, and especially that type of filter which is described in Chapter XXI, "Filtering" pages 371 to and including page 376, of the publication "American Petroleum Refining" by Bell second edition; D. Van Nostrand Company, publishers.

The particular object of this invention is, to supply an efficient easily-removable strainer organization for the lower opening of the filter, the removal of which organization is accomplished downwardly and outwardly, when the lid of the filter ring is opened.

The construction whereby we are enabled to attain this object is clearly illustrated in the accompanying drawings in which.

The construction and arrangements of the several elements of our invention, as illustrated in said drawings is as follows:

A fragment of the adjacent portion of the filter shell or body is shown at 1; the terminal or outlet ring is shown at 2, this ring being secured to the filter shell in any usual manner, as by rivets or by welding, as shown at 3. The interior wall of said ring, adjacent its upper end is provided with an inwardly-projecting flange, 4, the lower face of which is machined so as to form a suitable seating and sealing face for the clay sealing-ring or flange 5 of the outlet screen organization.

Said screen organization comprises a perforated shell, 6, having the form of an inverted, truncated cone, the upper larger end of which is securely attached to said sealing ring, 5, in any suitable manner that will form a joint therewith impervious to the passage of the filtering clay; the lower, smaller end of said screen organization is equipped with a clay gate consisting of a tubular nipple, 7, which may be either formed integrally with said shell, or it may be secured thereto in any other suitable manner. Adjacent the lower end of said nipple, a transverse slot is formed through a portion of the wall thereof in which is inserted a gate valve, 8, that is hinged or pivoted to said nipple at 9, whereby said gate may swing to the fully closed position, or be fully opened as desired, for the retention within or outflow of the clay from the filter; a handle, 10, is provided for the manipulation of said gate whereby it may be opened or closed.

Said terminal ring, 2, is provided at its lower end with a downwardly-opening lid, 11, which, when in the closed position is secured thereat by means of bolts, such as are commonly used in this detail of filter construction.

As previously stated, the assembly of the screen organization within the terminal ring, 2, is of such character that said organization may be removed from said ring through the open bottom of the ring, for cleaning, repairs or any other reason; provision for such assembly is made in the following manner:

The inner wall of ring 2 is provided with a plurality of equally spaced, vertically disposed keys, 12, the upper ends of which extend into close proximity to the under face of flange 4, but spaced therefrom for a distance that is somewhat less than the thickness of the screen flange, 5.

Figure 1:
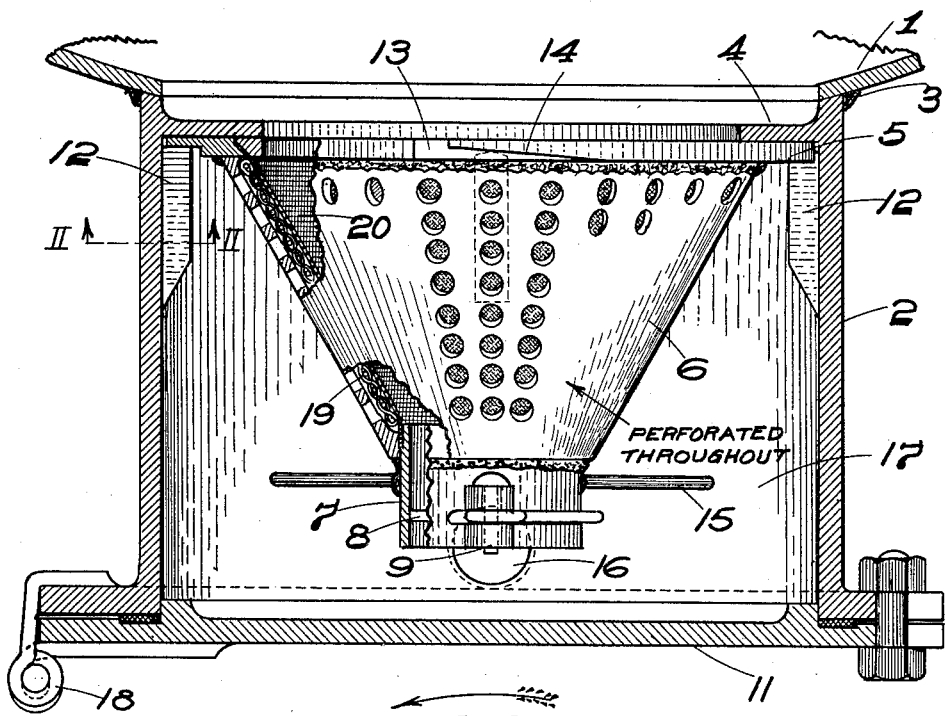
Fig. 1 is a central vertical section through a filter ring, showing our improved strainer element, or screen in position therein, a portion of the left-hand wall of said strainer being broken away to expose the interior construction to view.
Figure 2:
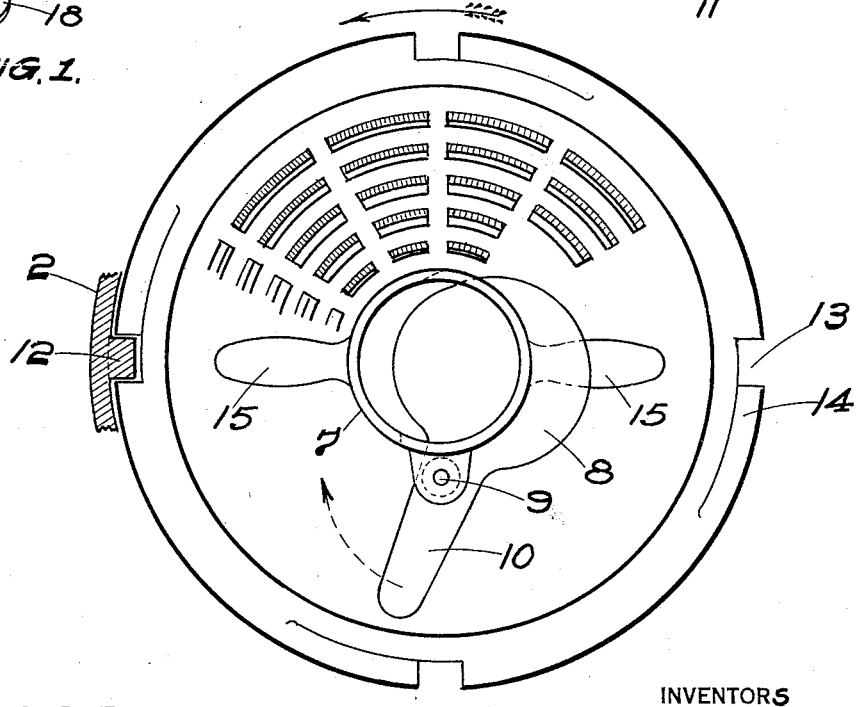
Fig. 2 is an inverted plan view of said screen organization showing the clay-gate thereof in a partially opened position, and also with modified form of perforations.

The outer edge of said flange, 5, is provided with keyways, 13, which correspond in number and spacing to keys 12. The lower face of said flange, 5, adjacent its outer edge, and extending thereto, is provided with an arcuate tapered seat, 14, extending in one direction from each of said notches, the metal of said seat being thinnest at the notch, as shown in Fig. 1 so that, when the screen organization is placed in position within the ring, as indicated in Fig. 1, and slightly rotated in the direction indicated by the arrow in Fig. 2, said tapered seat bears upon the upper end or head of its respective keys, until the increasing thickness of the metal of said seat, 14, causes the upper face of flange 5 to contact firmly with the lower adjacent face of flange 4, and thus to form a clay-tight joint therewith, and to secure firmly said screen organization in its service position. A partial rotation of said screen in the opposite direction releases it for ready removal through the open bottom of the ring 2. Handles, 15, are provided for the ready manipulation of said screen organization in attaching, detaching and removing same.

One or more pipe taps as 16 provide for the withdrawal of filtrate from the chamber 17. Similar provision for withdrawal of filtrate may be made in the lid, 11. Said lid is provided with a suitable hinge as shown at 18.

Any suitable strainer or screening may be supplied to the inner wall of the perforated conical shell, 6, which will permit filtrate to pass and restrain the passage of the filtering material therethrough. As shown in the drawing, such screening consists of a relatively heavy woven wire, 19, and superposed upon that is a layer of wire cloth, 20, of fine mesh, the fineness of which depends upon the grade of clay to be used as a filtering material, of which there are numerous grades, as stated in the publication mentioned at the head of this specification; but 60 mesh is generally used.

From the foregoing, it will be readily noted that our improved screen organization and the outlet gate therefor form a substantially unitary organization of particular facility as to convenience of removal from the filter, and the cleaning of the screen wire carried thereby, and the reinsertion of the screen in its service position.

We claim the following:

A screen organization for filter outlets comprising in combination with the terminal outlet ring carried at the lower end of said filter which ring is provided interiorly with an inwardly-projecting flange located in proximity to the upper portion thereof, a plurality of keys carried by the inner wall of said ring with their upper end faces spaced from and in close proximity to the lower face of said flange, also a closure member for the lower opening of said ring; a screen organization for the interior of said ring consisting of an inverted, truncated, conical, perforated shell provided at its upper larger end with an outwardly projecting flange for contact by its upper face with the lower face of said internal flange, said shell flange having in the outer edge thereof a plurality of keyways for the passage of said keys, the metal of said shell flange upon the under face thereof at one side of each of said keyways being formed into a downwardly slanting arcuate seat for contact with and impingement upon the upper end of its respective key, so that a partial rotation of said shell causes the upper face of its flange to be moved into close contact with the lower juxtaposed face of said ring flange, whereby ready removal of said shell through the bottom of said ring and its replacement therein is provided for, a screen structure which is pervious to the filtrate issuing from said filter and impervious to the filtering material therein, forming a lining for the inner wall of said shell, and a gate for the outflow of said filtering material secured to the lower end of said shell.

In testimony whereof we affix our signatures.

MILES P. BROWN.
JAMES W. BROWN.